United States Patent
Lee

(10) Patent No.: US 11,914,799 B2
(45) Date of Patent: Feb. 27, 2024

(54) INTERACTIVE CONTROL SYSTEM

(71) Applicant: Silicon Integrated Systems Corp., Hsinchu (TW)

(72) Inventor: Min-han Lee, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 17/930,249

(22) Filed: Sep. 7, 2022

(65) Prior Publication Data

US 2023/0078321 A1  Mar. 16, 2023

(30) Foreign Application Priority Data

Sep. 10, 2021  (TW) .................................. 110210713

(51) Int. Cl.
*G06F 3/0354* (2013.01)
*G06F 3/038* (2013.01)
*G06F 3/041* (2006.01)
*H04M 1/72412* (2021.01)

(52) U.S. Cl.
CPC .......... *G06F 3/03545* (2013.01); *G06F 3/038* (2013.01); *G06F 3/04162* (2019.05); *H04M 1/72412* (2021.01); *G06F 2203/04101* (2013.01); *H04M 2201/40* (2013.01)

(58) Field of Classification Search
CPC .. G06F 3/03545; G06F 3/04162; G06F 3/038; G06F 2203/04101; G06F 3/0383; H04M 1/72412; H04M 2201/40
See application file for complete search history.

(56) References Cited

U.S. PATENT DOCUMENTS

| | | | |
|---|---|---|---|
| 2014/0362024 A1* | 12/2014 | Hicks .................... | G06F 1/1698 345/174 |
| 2015/0050879 A1* | 2/2015 | MacDuff .............. | H04B 5/0056 455/39 |
| 2016/0005150 A1* | 1/2016 | Ghassabian ........... | G06F 3/0488 345/654 |
| 2019/0155411 A1* | 5/2019 | Kinrot .................. | G06F 3/0383 |
| 2019/0369755 A1* | 12/2019 | Roper ................... | G06F 3/0481 |
| 2022/0385753 A1* | 12/2022 | Chen ..................... | G06F 3/165 |

* cited by examiner

*Primary Examiner* — Gerald Johnson
(74) *Attorney, Agent, or Firm* — PV IP PC; We Te Chung; Zhigang Ma

(57) ABSTRACT

An interactive control system includes: an active pen; and an electronic device configured to wirelessly control the active pen, receive a user command, and generate a control command according to the user command, wherein at least one of the active pen and the electronic device is configured to execute a control function according to the control command.

9 Claims, 2 Drawing Sheets

INTERACTIVE CONTROL SYSTEM

CROSS-REFERENCE TO RELATED APPLICATIONS

This application claims the priority of Taiwan Patent Application No. 110210713, filed on Sep. 10, 2021, the disclosure of which is incorporated herein by reference in its entirety.

TECHNICAL FIELD OF DISCLOSURE

The present disclosure relates to the interactive control technology field, and more particularly to an interactive touch system.

BACKGROUND OF DISCLOSURE

Currently, most commercially available active pens have a single function, such as writing text or drawing on touch control devices. The active pens lack interaction with the touch control devices or other electronic devices, such as mobile terminals. For example, the touch control devices or the mobile devices lack a function of controlling the active pens, so more interactive functions cannot be created between the touch-sensitive devices or the mobile devices and the active pens.

Therefore, there is a need to solve the above-mentioned problems in the prior art.

SUMMARY OF DISCLOSURE

An objective of the present disclosure is to provide an interactive control system capable of solving the problems in the prior art.

The interactive control system of the present disclosure includes: an active pen; and an electronic device configured to wirelessly control the active pen, receive a user command, and generate a control command according to the user command, wherein at least one of the active pen and the electronic device is configured to execute a control function according to the control command.

In the interactive control system of the present disclosure, the electronic device is configured to receive the user command and generate the control command according to the user command. The at least one of the active pen and the electronic device is configured to execute the control function according to the control command. The electronic device can wirelessly control the active pen. Alternatively, the electronic device can execute the control function according to the control instruction to indicate the state between the active pen and the electronic device, thereby achieving the interactive function between the electronic device and the active pen.

DETAILED DESCRIPTION OF DISCLOSURE

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
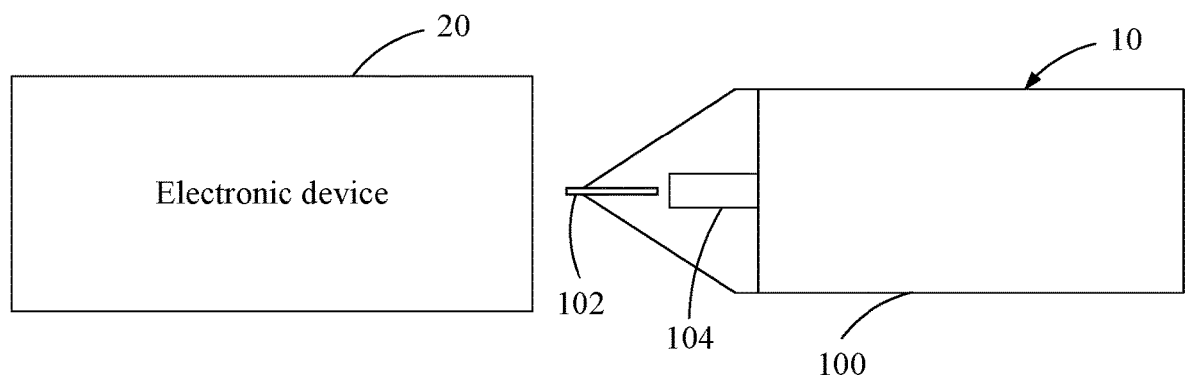
FIG. 1 illustrates an interactive control system in accordance with an embodiment of the present disclosure.
Figure 2:
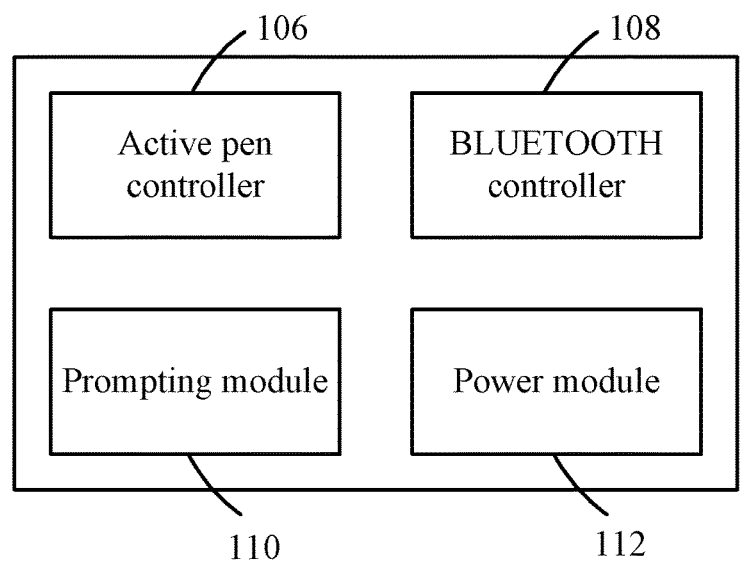
FIG. 2 illustrates a block diagram of an active pen in accordance with an embodiment of the present disclosure.

Please refer to FIG. 1 and FIG. 2. FIG. 1 illustrates an interactive control system 1 in accordance with an embodiment of the present disclosure. FIG. 2 illustrates a block diagram of an active pen 10 in accordance with an embodiment of the present disclosure.

The interactive control system 1 includes the active pen 10 and an electronic device 20.

The electronic device 20 is configured to wirelessly control the active pen 10, receive a user command, and generate a control command according to the user command. At least one of the active pen 10 and the electronic device 20 is configured to execute a control function according to the control command. The control function is, for example but not limited to, a prompt function.

In one aspect, the user command is generated by a user through the electronic device 20. More specifically, the electronic device 20 is installed with an application. The user can generate the command user by executing the application. After receiving the user command, the electronic device 20 can generate the control command according to the user command. The electronic device 20 is configured to wirelessly transmit the control command to the active pen 10. The active pen 10 is configured to execute the control function according to the control command. That is, the electronic device 20 can wirelessly control the active pen 10, thereby achieving an interactive function between the electronic device 20 and the active pen 10.

In another aspect, the user command is generated by the user through the electronic device 20. More specifically, the electronic device 20 is installed with an application. The user can generate the user command by executing the application. After receiving the user command, the electronic device 20 can generate the control command according to the user command. The electronic device 20 is configured to execute the control function according to the control command to indicate a state between the active pen 10 and the electronic device 20, for example, a distance between the active pen 10 and the electronic device 20 or a position of the active pen 10 located by the electronic device 20. That is, the electronic device 20 can detect the distance between the active pen 10 and the electronic device 20 or locate the position of the active pen 10, thereby achieving an interactive function between the electronic device 20 and the active pen 10.

The active pen 10 is configured to generate a signal. The electronic device 20 can be configured to detect the signal. For example, the signal is generated by touching a touch panel of the electronic device 20 by the active pen 10. That is, the signal is a touch signal or a pressure sensing value. Alternatively, the signal is generated by hovering on the touch panel by the active pen 10. That is, the signal is a hovering signal.

The active pen 10 includes a case 100, a pen tip 102, a pressure sensing element 104, an active pen controller 106, a BLUETOOTH controller 108, a prompting module 110, and a power module 112.

The case 100 has a hollow structure. The pen tip 102 is disposed at a position extending from one end of the case 100 outwardly. The pressure sensing element 104 is configured to detect a pen pressure signal for the electronic device 20 to obtain the pressure sensing value of the active pen 10 on the touch panel of the electronic device 20.

As described above, in order to increase an interactive functions of the active pen 10 and the electronic device 20, after the electronic device 20 is configured to generate the control command after receiving the user command, the at least one of the active pen 10 and the electronic device 20 is configured to execute the control function according to the control command.

Each of the interactive function between the electronic device 20 and the active pen 10 according to different embodiments of the present disclosure will be described in detail below.

In one embodiment, the user command is a timing command. The control function is a prompting function. The electronic device 20 is installed with a timing application. The user sets a time length through the timing application. For example, five minutes are set. The electronic device 20 is configured to start timing after receiving the timing command. When the timing reaches the time length, that is five minutes, the control command is generated. Then, the electronic device 20 is configured to transmit the control command to the BLUETOOTH controller 108 of the active pen 10 through the BLUETOOTH technology. The BLUETOOTH controller 108 is configured to control the prompting module 110 to execute the prompting function according to the control command, so that the active pen 10 is configured to achieve a timing notification function.

The prompting module 110 is, for example but not limited to, a light-emitting diode (LED) module. The LED module is configured to emit light to indicate that the electronic device 20 has timed for 5 minutes.

In another embodiment, the electronic device 20 is a mobile phone. The user command is an incoming call notification command. The control function is a prompting function. The electronic device 20 is installed with an incoming call notification application. The user sets or activates an incoming call notification function through the incoming call notification application. When the electronic device 20 receives an incoming call, the control command is generated. Then, the electronic device 20 is configured to transmit the control command to the BLUETOOTH controller 108 of the active pen 10 through BLUETOOTH technology. The BLUETOOTH controller 108 is configured to control the prompting module 110 to execute the prompting function according to the control command, thereby enabling the active pen 10 to achieve the incoming call notification function.

The prompting module 110 is, for example but not limited to, a light-emitting diode module. The light-emitting diode module is configured to emit light to indicate that the electronic device 20 has an incoming call.

In yet another embodiment, the user command is a distance detecting command. The control function is a prompting function. The electronic device 20 is installed with a distance detecting application. The user sets a distance, for example, 3 meters, through the distance detecting application. When the electronic device 20 detects that a distance between the electronic device 20 and the active pen 10 exceeds the set distance, that is, 3 meters, the control command is generated. The electronic device 20 is configured to execute the prompting function according to the control command. For example, the prompting function shows that the distance between the electronic device 20 and the active pen 10 exceeds 3 meters through the distance detection application, thereby achieving a function of avoiding loss of the active pen 10.

In yet another embodiment, the user command is a distance measuring command. The control function is a prompting function. The electronic device 20 is installed with a distance measuring application. The user activates the distance measuring application to detect a distance between the electronic device 20 and the active pen 10 by BLUETOOTH technology to generate the control command. The electronic device 20 is configured to execute the prompting function according to the control command. For example, the prompting function shows the distance between the electronic device 20 and the active pen 10 through the distance measuring application, thereby achieving a distance measuring function.

In yet another embodiment, the user command is a positioning command. The control function is a prompting function. The electronic device 20 is installed with a positioning application. The user activates the positioning application to detect a position of the active pen 10 by BLUETOOTH technology to generate the control command. The electronic device 20 is configured to execute the prompting function according to the control command. For example, the prompting function shows the position of the active pen 10 through the positioning application, thereby achieving a function of avoiding loss of the active pen 10.

In yet another embodiment, the user command is a timing command. The control function is a function of turning off the active pen 10. The electronic device 20 is installed with a timing application. The user sets a time length through the timing application, for example, 30 minutes. The electronic device 20 is configured to start timing after receiving the timing command. When the timing reaches the time length, that is, 30 minutes, the control command is generated. Then, the electronic device 20 is configured to transmit the control command to the BLUETOOTH controller 108 of the active pen 10 through BLUETOOTH technology. The BLUETOOTH controller 108 is configured to turn off at least one function of the active pen 10 according to the control command. The present embodiment can be applied to exam scenarios.

The active pen controller 106 is configured to control cooperative operations of the pressure sensing element 104, the BLUETOOTH controller 108, the prompting module 110, and the power module 112.

The power module 112 includes a battery and a charger. The battery is configured to provide power required by the active pen 10. The charger is configured to receive an external power source to charge the battery.

Furthermore, it should be noted that a protocol used by the active pen 10 to communicate with the electronic device 20 through the pen tip 102 can be a one-way protocol or a two-way protocol. When the protocol used by the active pen 10 to communicate with the electronic device 20 through the pen tip 102 is a one-way protocol, the active pen 10 only transmits signals to the electronic device 20 and does not receive signals transmitted by the electronic device 20. When the protocol used by the active pen 10 to communicate with the electronic device 20 through the pen tip 102 is a two-way protocol, the active pen 10 can transmit signals to the electronic device 20 and can receive signals transmitted by the electronic device 20.

Figure 3:
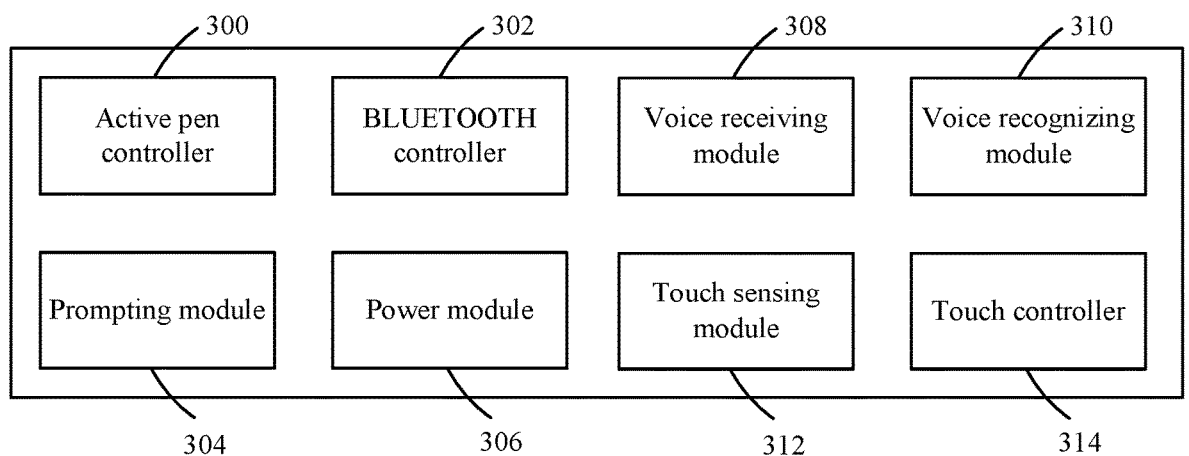
FIG. 3 illustrates a block diagram of an active pen in accordance with another embodiment of the present disclosure.

Please refer to FIG. 3. FIG. 3 illustrates a block diagram of an active pen 30 in accordance with another embodiment of the present disclosure.

A case, a pen tip, and a pressure sensing element of the active pen 30 can be referred to the related descriptions in FIG. 1, and details are not repeated herein.

The active pen 30 includes an active pen controller 300, a BLUETOOTH controller 302, a prompting module 304, a power module 306, a voice receiving module 308, a voice recognizing module 310, a touch sensing module 312, and a touch controller 314.

The BLUETOOTH controller 302, the prompting module 304, and the power module 306 can be referred to the related descriptions in FIG. 2, and details are not repeated herein. Interactive functions of the active pen 30 and an electronic device can be referred to the related descriptions in FIGS. 1-2, and details are not repeated herein.

In the active pen 30 of the present embodiment, the voice receiving module 308 is configured to receive at least one voice signal. The voice receiving module 308 can be a microphone or a microphone array.

The voice recognizing module 304 is configured to locally analyze the at least one voice signal to generate a voice control command and transmit the voice control command to the BLUETOOTH controller 302. The BLUETOOTH controller 302 is configured to transmit the voice control command to the electronic device 20 in FIG. 1. The electronic device 20 is configured to execute a control function according to the voice control command. The control function is, for example but not limited to, a recording function. That is, the active pen 30 can remotely control the electronic device 20.

In another embodiment, the voice recognizing module 304 can be disposed in the electronic device 20 in FIG. 1. In detail, when the voice recognizing module 310 is disposed in the electronic device 20, the BLUETOOTH controller 302 is configured to transmit the at least one voice signal to the electronic device 20 through the BLUETOOTH technology. The voice recognizing module 310 disposed in the electronic device 20 is configured to remotely analyze the at least one voice signal to generate a voice control command. The electronic device 20 is configured to execute a control function according to the voice control command. The control function is, for example but not limited to, a recording function. That is, the active pen 30 can remotely control the electronic device 20.

The voice recognizing module 310 can have a function of eliminating noise in the at least one voice signal, thereby enhancing accuracy of recognizing the at least one voice signal.

The touch sensing module 312 is configured to sense at least one touch. The touch sensing module 312 includes a plurality of touch sensors.

The touch controller 314 is configured to generate a touch control command according to the at least one touch and transmit the touch control command to the BLUETOOTH controller 302. The BLUETOOTH controller 302 is configured to transmit the touch control command to the electronic device 20 in FIG. 1. The electronic device 20 is configured to execute a control function according to the touch control command. The control function is, for example but not limited to, controlling a previous page or a next page, mute, opening an application, or activating a photographing function of a camera of the electronic device 20 during a presentation. That is, the active pen 30 can remotely control the electronic device 20.

The active pen controller 300 is configured to control cooperative operations of the pressure sensing element 104, the BLUETOOTH controller 302, the prompting module 304, the power module 306, the voice receiving module 308, and the voice recognizing module 310, the touch sensing module 312, and the touch controller 314.

In the interactive control system of the present disclosure, the electronic device is configured to receive the user command and generate the control command according to the user command. The at least one of the active pen and the electronic device is configured to execute the control function according to the control command. The electronic device can wirelessly control the active pen. Alternatively, the electronic device can execute the control function according to the control instruction to indicate the state between the active pen and the electronic device, thereby achieving the interactive function between the electronic device and the active pen.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. An interactive control system, comprising:
an active pen comprising a BLUETOOTH controller, a voice receiving module configured to receive at least one voice signal, and a prompting module; and
an electronic device configured to wirelessly control the active pen, receive at least a user command, and generate a control command according to the user command, wherein the user command is a timing command and the electronic device is installed with a timing application;
wherein the BLUETOOTH controller of the active pen is configured to transmit the at least one voice signal to the electronic device in such a way that the active pen is in no contact with the electronic device, and the electronic device comprises a voice recognizing module configured to generate a voice control command by remotely analyzing the at least one voice signal, wherein the active pen and the electronic device are selectively controlled to execute a control function according to the control command and/or the voice control command such that the active pen remotely and contactlessly control the electronic device;
wherein the control function is a prompting function, a time length is set for the timing command through the timing application according to the voice control command, and the electronic device is configured to start timing after receiving the timing command, wherein the control command is generated when the timing reaches the time length, the electronic device is configured to transmit the control command to the BLUETOOTH controller of the active pen, and the BLUETOOTH controller is configured to control the prompting module to execute the prompting function according to the control command;

wherein the electronic device is configured to execute another control function according to the voice control command and/or the control command to indicate a state between the active pen and the electronic device for interactive functionality between the electronic device and the active pen.

2. The interactive control system according to claim 1, wherein the electronic device is a mobile phone, the user command is an incoming call notification command, the electronic device is installed with an incoming call notification application, an incoming call notification function is set or activated through the incoming call notification application, the control command is generated when the electronic device receives an incoming call, the electronic device is configured to transmit the control command to the BLUETOOTH controller, and the BLUETOOTH controller is configured to control the prompting module to execute the prompting function according to the control command.

3. The interactive control system according to claim 1, wherein
the BLUETOOTH controller, in response to that the timing reaches the time length, is configured to turn off at least one function of the active pen according to the control command.

4. The interactive control system according to claim 1, wherein the user command is a distance detecting command, the electronic device is installed with a distance detecting application, a distance is set through the distance detecting application, the control command is generated when the electronic device detects that a distance between the electronic device and the active pen exceeds the set distance, and the electronic device is configured to execute the prompting function according to the control command.

5. The interactive control system according to claim 1, wherein the user command is a distance measuring command, the electronic device is installed with a distance measuring application, the distance measuring application is activated to detect a distance between the electronic device and the active pen to generate the control command, and the electronic device is configured to execute the prompting function according to the control command.

6. The interactive control system according to claim 1, wherein the user command is a positioning command, the electronic device is installed with a positioning application, the positioning application is activated to detect a position of the active pen to generate the control command, and the electronic device is configured to execute the prompting function according to the control command.

7. The interactive control system according to claim 1, wherein the active pen comprises:
a voice recognizing module configured to analyze the at least one voice signal to generate a voice control command and transmit the voice control command to the BLUETOOTH controller, wherein the BLUETOOTH controller is configured to transmit the voice control command to the electronic device, and the electronic device is configured to execute another control function according to the voice control command.

8. The interactive control system according to claim 1, wherein the active pen comprises:
a touch sensing module configured to sense at least one touch; and
a touch controller configured to generate a touch control command according to the at least one touch and transmit the touch control command to the BLUETOOTH controller, wherein the BLUETOOTH controller is configured to transmit the touch control command to the electronic device, and the electronic device is configured to execute another control function according to the touch control command.

9. The interactive control system according to claim 1, wherein the user command is generated through the electronic device.

* * * * *